(12) United States Patent
Jiang et al.

(10) Patent No.: US 7,774,661 B2
(45) Date of Patent: Aug. 10, 2010

(54) REGISTER READ MECHANISM

(75) Inventors: Yibo Jiang, Shanghai (CN); Larry Lei Wu, Sunnyvale, CA (US); Gang Shan, Shanghai (CN)

(73) Assignee: Montage Technology Group Limited, Grand Caymen (KY)

( * ) Notice: Subject to any disclaimer, the term of this patent is extended or adjusted under 35 U.S.C. 154(b) by 552 days.

(21) Appl. No.: 11/735,946

(22) Filed: Apr. 16, 2007

(65) Prior Publication Data

US 2008/0244369 A1 Oct. 2, 2008

Related U.S. Application Data

(60) Provisional application No. 60/908,895, filed on Mar. 29, 2007.

(51) Int. Cl.
*G11C 29/00* (2006.01)
(52) U.S. Cl. ............... 714/718; 714/724; 365/189.02; 365/201
(58) Field of Classification Search ............... 714/718, 714/724
See application file for complete search history.

(56) References Cited

U.S. PATENT DOCUMENTS 4,924,458 A * 5/1990 Obara .................. 370/360
7,028,151 B2 * 4/2006 Imai et al. .............. 711/156
2003/0009644 A1 * 1/2003 Fujii .................... 711/156
2006/0259678 A1 * 11/2006 Gervasi ................. 711/2

OTHER PUBLICATIONS

JEDEC standard, "Definition of the SSTE328882 Registering Clock Driver with Parity for DDR3 RDIMM Applications".

* cited by examiner

*Primary Examiner*—Esaw T Abraham
(74) *Attorney, Agent, or Firm*—Ivy Mei

(57) ABSTRACT

Integrated circuits have expanded a set of custom registers and a read mechanism for control registers. One embodiment includes a circuit having a first set of registers; a second set of registers to be written via one or more write operations addressed to one or more registers of the first set; and a read controller coupled with the first and second sets of registers, the read controller to selectively output a portion of data stored in the first and second sets of registers based on data stored in one or more registers of the second set. In one embodiment, the circuit further includes a logic block; and a multiplexer to select from an output of the logic block and an output of the read controller as an output of the circuit based on the data stored in the one or more registers of the second set.

21 Claims, 5 Drawing Sheets

REGISTER READ MECHANISM

CROSS REFERENCE TO RELATED APPLICATION

This application claims priority of the U.S. provisional patent application with the Ser. No. 60/908,895 filed Mar. 29, 2007, the disclosure of which is incorporated herein by reference.

FIELD OF THE TECHNOLOGY

At least some embodiments of the disclosure relate to read access to control registers in integrated circuits.

BACKGROUND

Registered Dual In-Line Memory Module Registered DIMM (RDIMM) buffers the address and control lines on the Dual In-Line Memory Module Registered DIMM (DIMM) to reduce signal loading. An SSTE32882 registering clock driver can be designed as a registered buffer to drive the address and control lines for DDR3 (Double Data Rate 3) RDIMM applications.

Joint Electron Device Engineering Councils (JEDEC) provides a standard which defines a number of configurable registers (control words) for the SSTE32882, such as "JEDEC standard (proposed), Definition of the SSTE32882 Registering Clock Driver with Parity for DDR3 RDIMM Applications". The control words can be used to optimize the operations of the registering clock driver for different applications. For example, based on the setting of the registers the registering clock driver can change its output characteristics such as timing, driven strength and skew, etc., to match different DIMM net topologies.

The SSTE32882 registering clock driver has sixteen control words. The functions of control words 0 to 5 are defined by the JEDEC standard, and the control words 8 to 15 are reserved for future use. The control words 6 and 7 are vendor specific. The JEDEC standard defines the write operations for these control words, but does not provide read operations for the control words.

SUMMARY OF THE DESCRIPTION

Integrated circuits having expanded a set of custom registers and a read mechanism for control registers are described here. Some embodiments are summarized in this section.

In one embodiment, a circuit includes: a first set of registers; a second set of registers coupled with the first set of registers, the second set of registers to be written via one or more write operations addressed to one or more registers of the first set; and a read controller coupled with the first and second sets of registers, the read controller to selectively output a portion of data stored in the first and second sets of registers based on data stored in one or more registers of the second set.

In one embodiment, the circuit is integrated on a chip, such as a registering clock driver integrated on the chip. In one embodiment, the registering clock driver is in accordance with a Joint Electron Device Engineering Councils (JEDEC) standard, such as a JEDEC standard for an SSTE32883 registering clock driver with parity for DDR3 (Double Data Rate 3) RDIMM (Registered Dual In-Line Memory Module) applications.

In one embodiment, the circuit further includes a logic block; and a multiplexer coupled with the logic block, the read controller and the second set of registers, the multiplexer to select from an output of the logic block and an output of the read controller as an output of the circuit based on the data stored in the one or more registers of the second set.

For example, the logic block may generate an output to indicate whether or not a parity error has occurred; and the read controller reads one bit from one of the first and second sets of registers according to the data stored in one of the second set of registers when one register of the first set is written. In one embodiment, the one bit read by the read controller is from the register of the first set that is being written according to an input data. In one embodiment, the one bit is read by the read controller before the register is written into according to the input data.

In one embodiment, when a first bit of a register of the second set is in a first state, the multiplexer selects the output of the logic block; when the first bit of the register of the second set is in a second state, the multiplexer selects the output of the read controller. In one embodiment, the first set of registers includes: a first plurality of registers to store data to control operations of the circuit according to a standard; and a second plurality of registers to store vendor specific data to control operations of the circuit.

For example, the second plurality of registers to store vendor specific data include a first register and a second register; the first register is to store data for selecting a group of registers from the second set; the second register is to receive first data identifying one or more bits of the selected group and second data to be written in the one or more bits identified according to the first data; the second data is to be written into the one or more bits of the selected group of registers of the second set in response to the second register being written into.

In one embodiment, when the first bit is in the second state, data stored in the one or more bits identified according to the first data is read by the read controller for selection by the multiplexer before the second data is written into the identified one or more bits. Alternatively, when the first bit is in the second state, data stored in the one or more bits identified according to the first data is rewritten back into the identified one or more bits, if the identified one or more bits do not include the first bit; and when the first bit is in the first state, the second data is written into the identified one or more bits.

In one embodiment, one or more second bits of the register of the second set is to store data identifying one or more bits of a register of the first set; when the first bit is in the second state, data stored in the one or more bits identified according to the one or more second bits is read by the read controller for selection by the multiplexer before the register of the first set is written into. Alternatively, one or more second bits of the register of the second set is to store data identifying one or more bits of a register of the first set; when the first bit is in the second state, data stored in the register of the first set is rewritten back into the register of the first set by the read controller when the circuit receives input to write into the register of the first set.

In one embodiment, an integrated circuit, includes: a plurality of registers; and a read controller coupled with the plurality of registers, the read controller to output a portion of data stored in a first register of the plurality of registers when the circuit receives input to write into the first register; where the portion is to be selected according to data stored in a second register of the plurality of registers.

In one embodiment, the integrated circuit further includes: a logic block; and a multiplexer coupled to the read controller and the logic block; when a bit of the second register is in a first state, the multiplexer selects logic block; and when the bit of the second register is in a second state, the multiplexer selects the read controller.

In one embodiment, an integrated circuit, includes: a first set of registers, including a first register and a second register; and a second set of registers coupled with the first set of registers, a group of registers of the second set to be identified by data stored in the first register, one or more bits of the group to be identified by a portion of data stored in the second register. In response to the second register being written into, a portion of data written into the second register is further written into the one or more bits of the group identified by the data stored in the first and second registers.

In one embodiment, the integrated circuit, further includes: a logic block to check parity error; a read controller to read out at least a portion of a register of the first and second sets when the integrated circuit receives an input to write into the register; and a multiplexer coupled to the read controller and the logic block. When a bit of the second set of registers is in a first state, the multiplexer selects the logic block; and when the bit of the second set of registers is in a second state, the multiplexer selects the read controller.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
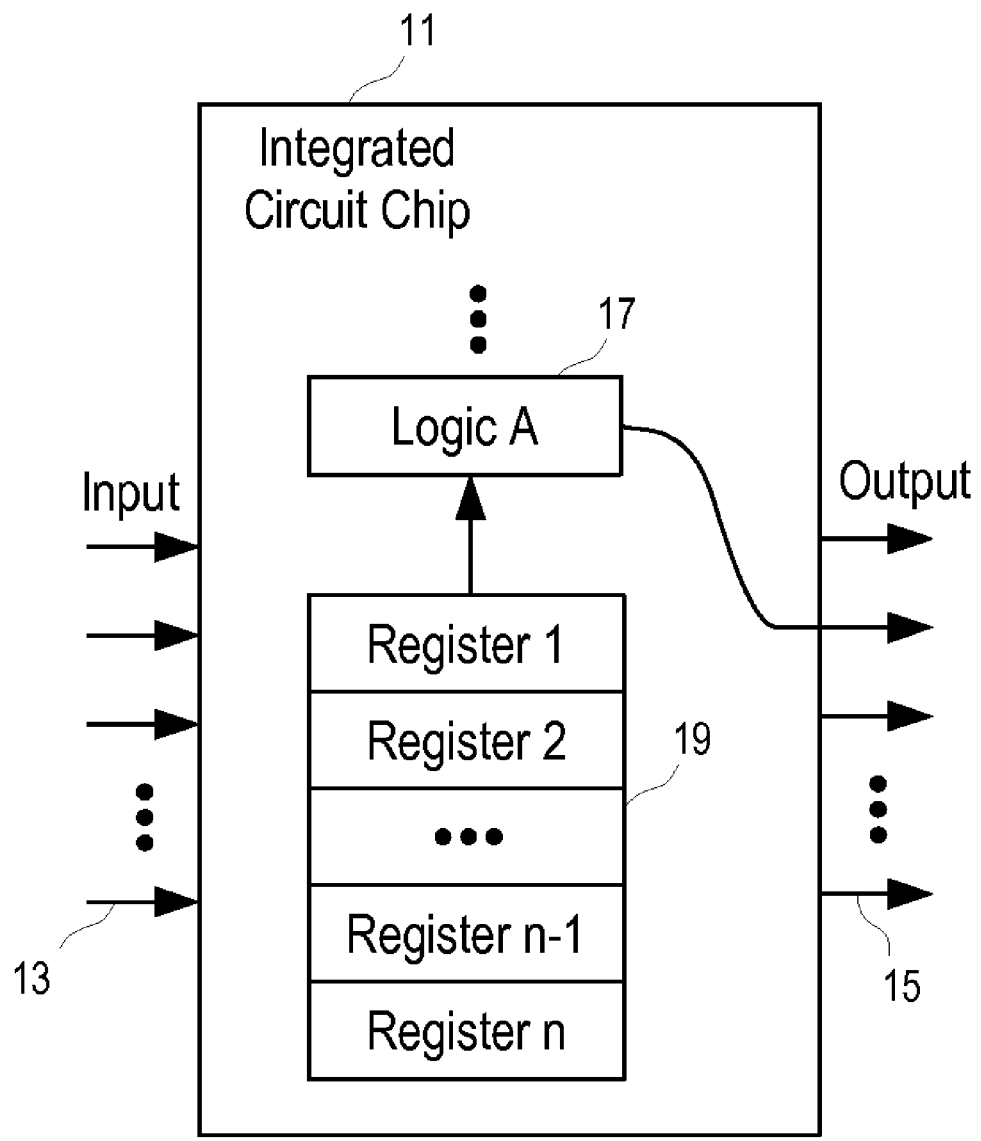
FIG. 1 illustrates an integrated circuit chip having a set of control registers.

The following description and drawings are illustrative and are not to be construed as limiting. Numerous specific details are described to provide a thorough understanding. However, in certain instances, well known or conventional details are not described in order to avoid obscuring the description. References to one or an embodiment in the disclosure are not necessarily references to the same embodiment; and, such references mean at least one.

The JEDEC standard for the SSTE32882 registering clock driver with parity defines the write operations to the registers of driver but provides no read access to the registers.

In one embodiment, it is recognized that read operations of control registers can be useful for design engineering, especially when testing or debugging the device. Thus, a registering clock driver is developed to include the support for read operations within the constraint of the JEDEC standard. With a read mechanism, design engineers can obtain the operating state of the device to help locate the error during debug.

In one embodiment, a register read mechanism is provided in the registering clock driver with parity for DDR RDIMM applications. The read mechanism allows a host to read out the data stored in the control word registers of a registering clock driver designed in accordance with a JEDEC standard for the SSTE32882 registering clock driver. This mechanism enables the status monitoring of the clock driver without changing its existing pin-out.

In one embodiment, the vendor-specific registers (control words) are used to address expanded custom registers, which can be configured to enable read operations of the registers, including the control words and the expanded custom registers.

In one embodiment, a read mechanism is designed to use the write commands to address the corresponding registers to be read and uses existing pins of the SSTE32882 registering clock driver to output the result. Such a read mechanism can be implemented with no changes to the pin configuration of the SSTE32882 registering clock driver. In one embodiment, the read operations of the registers of a registering clock driver are triggered by write commands to minimize the modifications of the host software.

Since the pin-out of the SSTE32882 has been strictly defined by the JEDEC standard, the read mechanism is implemented based on the current existing input and output pads with no additional pins added.

In one embodiment, when one bit of the expanded custom registers is set to enable the read operation, the output pin for parity error is used to output the result of the read operation. Thus, the data in the control words and the expanded custom registers can be read one bit a time through the existing output pin in a read mode.

In one embodiment, the vendor specific control words 6 and 7 are used to address up to 128 bits of a custom register file, which can be used to define vendor specific control words, including a control bit for enable/disable read operators and register offset bits to select one bit from a control word that is to be read for outputting through the pin for parity error.

In one embodiment, an integrated temperature sensor is provided inside the clock driver. Using the register read mechanism, design engineers can read out the current temperature of the device. For example, the current temperature can be stored in the customer register file and read out one bit a time through the output pin for parity error.

The techniques disclosed herein can also be used in other integrated circuits to provide read mechanisms via write operations.

FIG. 1 illustrates an integrated circuit chip (11) having a set of control registers (19). The integrated circuit chip (11) has a logic block (17) which can generate an output via pins (15) in response to input received from pins (13). The integrated circuit chip (11) accepts write commands to store control words in the registers (19). The control words can be used to optimize the operations of the integrated circuit chip (11) for various different applications.

For example, the integrated circuit chip (11) can be an SSTE32883 registering clock driver in accordance with a JEDEC standard, in which the logic block (17) generates an indicator of parity error.

One embodiment extends the integrated circuit chip (11) through the write operations for one or more registers of the control registers (19) without changing the input/output protocol and without adding additional pins.

Figure 2:
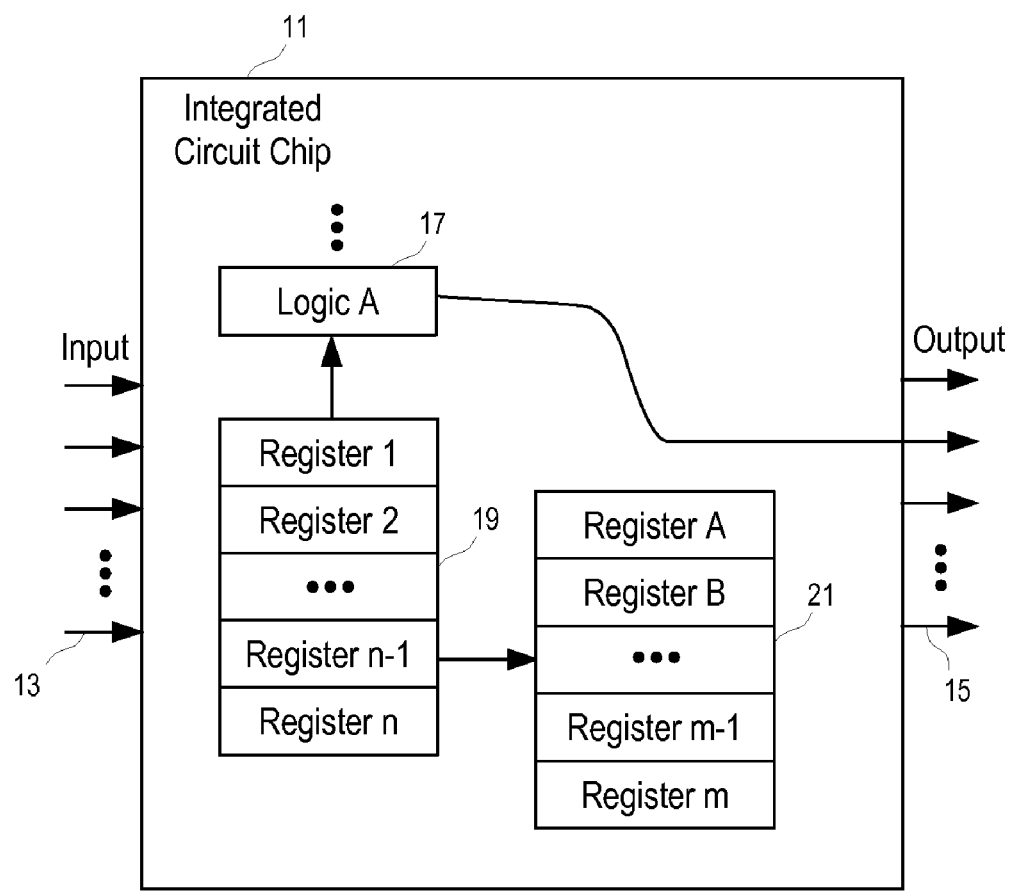
FIG. 2 illustrates an integrated circuit chip having expanded custom registers according to one embodiment.

FIG. 2 illustrates an integrated circuit chip having expanded custom registers according to one embodiment. In FIG. 2, an indirect register addressing scheme is used to expand the available registers without changing the decoding scheme for control words. In FIG. 2, one or more of the control registers (19) are used to receive the address and data value for writing into the expanded registers (21).

For example, in response to a write command addressed to a vendor specific register, the data written into the vendor specific register can be used as input data and/or address data to write into the expanded registers (21). In one embodiment, a further vendor specific register can be used to store part of the input data and/or address data for the write operation of the expanded registers.

When n bits of the registers (19) are used as address data and m bits of the registers (19) are used as input data, the (n+m) bits can be used to write into $m*2^n$ bits of expanded registers.

In one embodiment, the expanded registers are used to store data for enabling read operations. Alternatively, the control register (19) can also be used to store data for enabling read operations.

Figure 3:
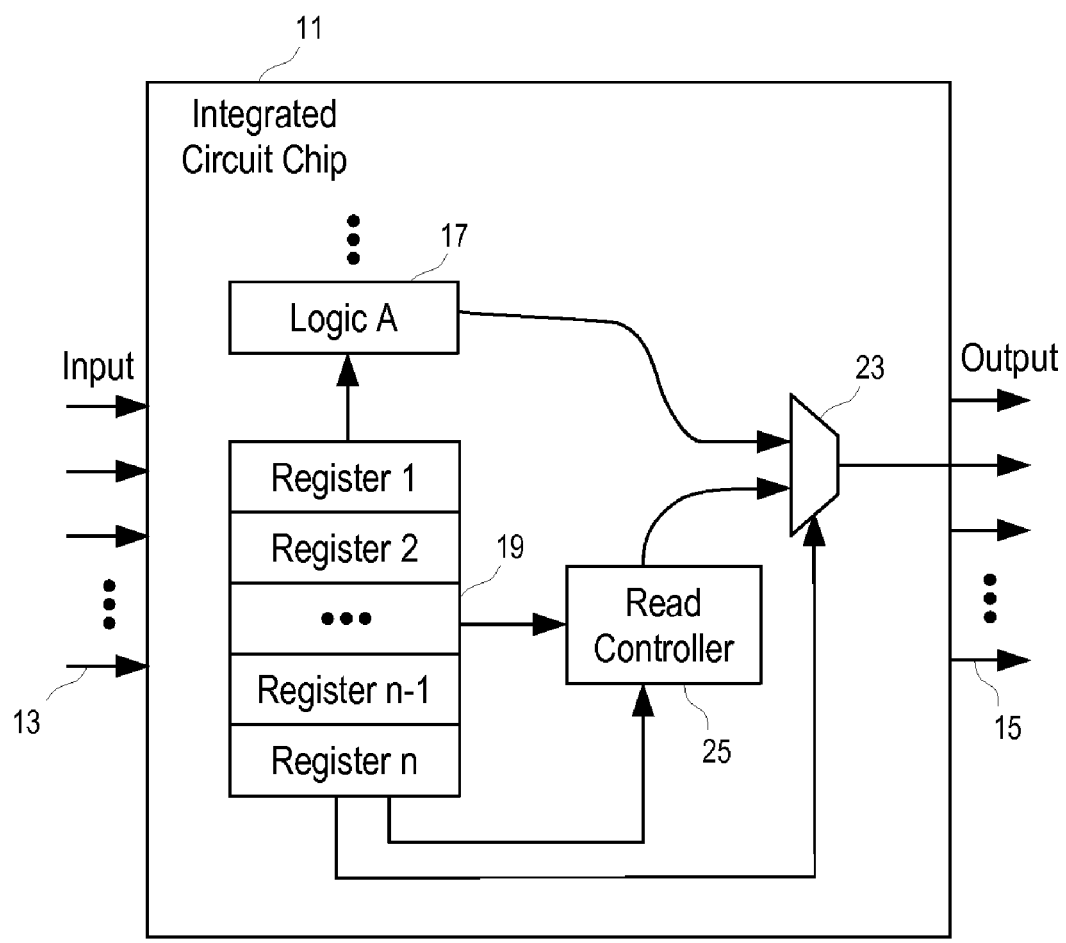
FIG. 3 illustrates an integrated circuit chip having a read mechanism for control registers according to one embodiment.

FIG. 3 illustrates an integrated circuit chip having a read mechanism for control registers according to one embodiment. In FIG. 3, the output port for the logic block (17) is reused to send out the data read from the target register to avoid adding new pads. For example, one bit of the control register (19) (e.g., one bit of a vendor specific register) can be used as a read_enable bit which is used to control the multiplexer (23) to select the output of the logic block (17) or the output of the read controller (25).

For example, in one embodiment, when the read_enable bit is set to 1, the multiplexer (23) is configured to select the logic block (17); and when the read_enable bit is set to 0, the multiplexer (23) is configured to select the read controller (25).

In one embodiment, the read controller (25) is configured to read a register when a write command is received to write into the register. In one embodiment, before the input data is written into the register, the data is read by the read controller (25). In another embodiment, when the read_enable bit is set to enable the read operation, the input data is not written into the register. Alternatively, when the read_enable bit is set to enable the read operation, the input data is ignored and the data read from the register is rewritten into the register. In one embodiment, one bit of the control register can be used to indicate whether the control register is to be written according to the input data when the read_enable bit is set to enable the read operation.

In one embodiment, the control register is wider than the output width for the logic block (17). The data stored in one register that can be written into in one write command has more bits than the output of the logic block (17). Thus, one or more offset bits can be used to select the subset of bits from the control register for outputting through the output pins for the logic block (17).

For example, when the logic block (17) generates a single bit output (e.g., parity error indicator), one of the vendor specific register can be configured to have the offset bits to select a desired bit from the control word for outputting through the output pin of the logic block (17).

Figure 4:
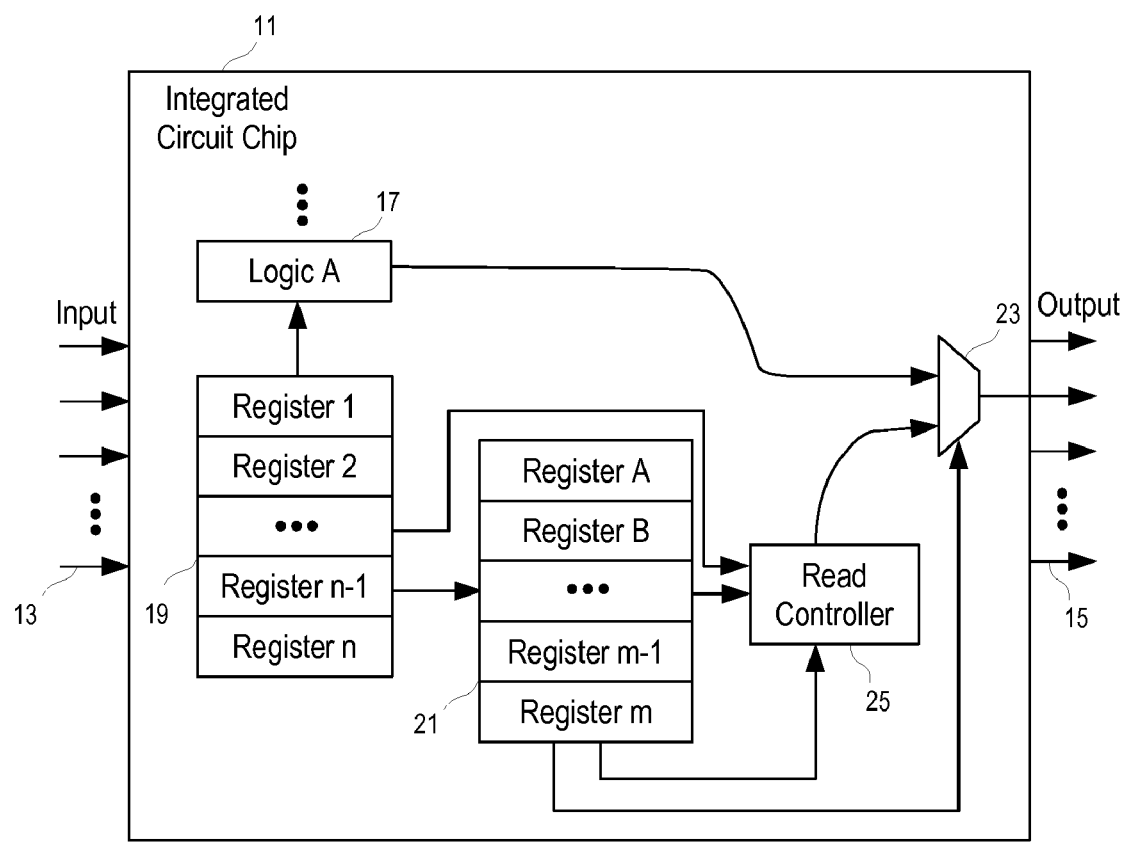
FIG. 4 illustrates an integrated circuit chip having expanded custom registers and a read mechanism for control registers according to one embodiment.

FIG. 4 illustrates an integrated circuit chip having expanded custom registers and a read mechanism for control registers according to one embodiment. In FIG. 4, one or more of the control registers (19) are used to address and write data into the expanded registers (21). A portion of the expanded registers (21) is used to facilitate read operations.

For example, one bit of the expanded registers (21) is used as the read_enable bit. One or more bits of the expanded registers (21) can be used as the offset bits, when the width of the control register is wider than the output of the logic block (17).

Alternatively, a finite state machine (e.g., a counter) can be used to automatically adjust the offset. For example, when the register that is currently read is different from that of the previous read operation, a counter can be set to point to the first bit of the control word. After the read operation, the counter is to have a value pointing the next bit of the control word. Thus, different bits of the control word can be sequentially read out through repeatedly sending write commands to the same register, while the read operation is enabled, without having to send write commands to update the offset bits.

Figure 5:
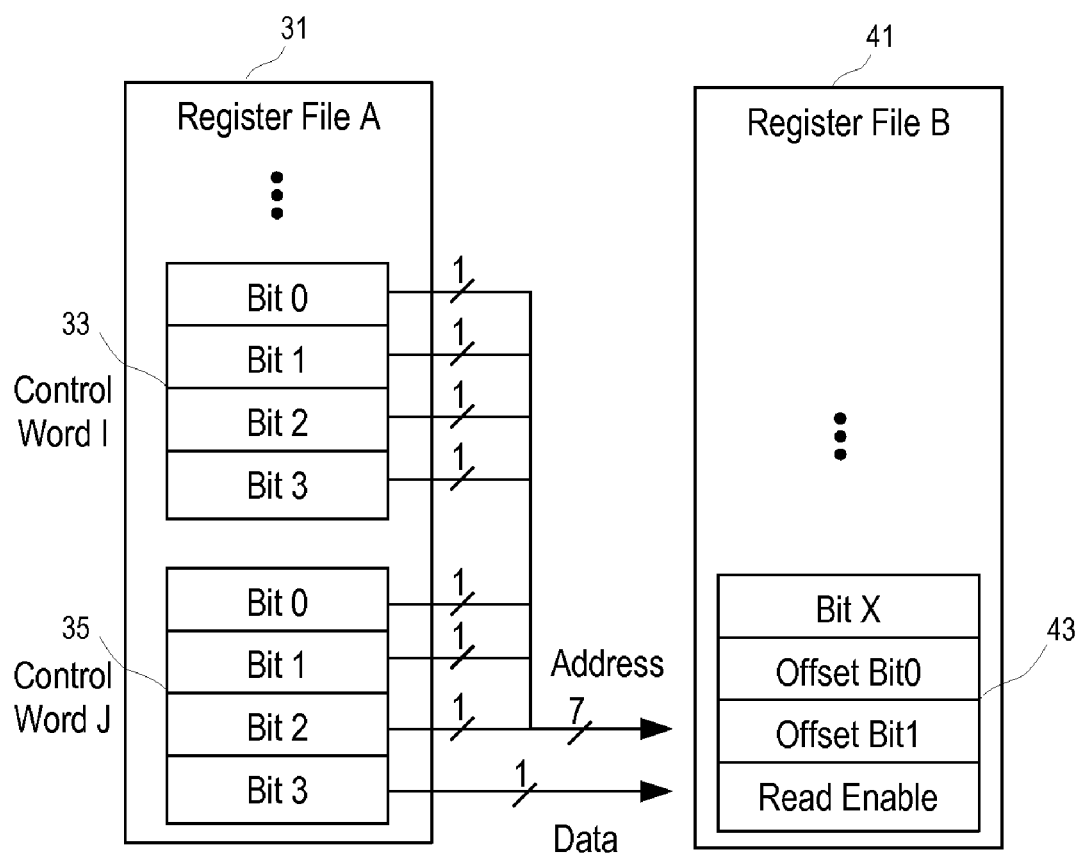
FIG. 5 illustrates a scheme to address control registers and custom registers according to one embodiment.

FIG. 5 illustrates a scheme to address control registers and custom registers according to one embodiment. In FIG. 5, register file A (31) contains a plurality of control registers, including registers (33 and 35) for control word I and control world J. Register file B contains a plurality of custom registers (43), including "Read Enable" bit.

In one embodiment, the registers in the register file A (31) can be directly written into via write commands received in the integrated circuit chip. The control words I and J in registers (33 and 35) are vendor specific control words, which can be used to expand the register file A (31).

In FIG. 5, each of the control word has 4 bits. In other embodiments, the control words may have more or less bits (e.g., 1 bit, 2 bits, 16 bits, etc.). In FIG. 5, seven of the eight bits of the control words are used as address data for register file B (41); and one of the eight bits of the control words is used as the input data for writing into the register file B (41).

In one embodiment, in response to receiving control word I (35) that contains the input data for the register file B (41), the control word I (33) and the control word J (35) are combined to generate address data for selecting one bit from the register file B (41) and the data provided in the control word J (35) is written into the selected bit. Alternatively, the control word J (35) may be written into the register file A (31) first; and the data stored in the control word J (35) is written into the register file B (41) in response to the writing of the control word I (33) into the register file A (31).

In one embodiment, each register in the register file B (41) has one bit. The registers (43) in the register file B (41) are grouped such that each group has 8 registers. The four bits of the control word I (33) are used to select one group from 16 groups; and three bits of the control world J (35) can be used to select one register from the selected group of 8 registers. Thus, the control word (33 and 35) can be used to address up to 128 one-bit registers in the register file B (41).

Thus, for example, to program a register bit in register file B (41), control word I (33) can be first written into the register file A (31) to specify the data for selecting a group; and then, control word J (35) can be written into the register file A (31) to provide the address bits for selecting a destination register bit from the group that is identified by the data in the control word I (33). It takes two write commands to program the register bit.

In another example, to program all bits of a particular register group, the control word I (33) can be first written into the register file A (31) to specify the data for selecting a group; and then, control word J (35) can be subsequently written into the register file A (31) eight times to program the eight bits of the particular register group. It takes nine write commands to program the register group. Using this approach, the 128 bits of the register file B (41) can be programmed using 144 write commands.

Alternatively, more bits of the control word (33 and 35) can be allocated for input data; and less bits of the control word (33 and 35) can be used for addressing the register file B (41). For example, 6 bits of the control words (33 and 35) can be used to address up to 64 two-bit registers; 5 bits of the control words (33 and 35) can be used to address up to 32 three-bit registers; 4 bits of the control words (33 and 35) can be used to address up to 16 four-bit registers; etc.

For example, 64 two-bit registers can be programmed with 80 write commands; 32 three-bit registers can be programmed with 48 write commands; and 16 four-bit registers can be programmed with 32 write commands.

In FIG. 5, the register file B (41) includes one "Read Enable" bit to indicate whether the integrated circuit chip is in a read mode. When in the read mode, the integrated circuit chip uses a read controller (e.g., 25 in FIG. 4) and a multiplexer (e.g., 23 in FIG. 4) to output the data read from a register from register file A (31) that is addressed by the write command, when then write command does not cause the write operation on register file B (41).

In one embodiment, the data resulting from the read operation is provided through a one-bit output channel (e.g., the pin for output parity error). Thus, the register file B (41) is further configured with two offset bits to select one bit from the control word read from the register A for output through the one-bit output channel.

For example, after the "Read Enable" bit is set to the read mode and the "Offset Bit0" and the "Offset Bit1" are programmed, via write commands for control words (33 and 35), the bit of a four-bit register in register file A (31) as selected by the "Offset Bit0" and the "Offset Bit1" in the register file B (41) can be read by sending a write command to write into the four-bit register.

In one embodiment, when the "Read Enable" bit is set to the read mode, the write command addressed to a register other than the control word I and J (33 and 35) causes the circuit to read out the data from the register first before writing the input data into the addressed register.

In one embodiment, the offset data and the "Read Enable" bit are configured in the same register group. For example, to read a bit from a register from the register file A (31), a first write command is used to write the control word I (33) that has the address data to select the register group that includes the "Read Enable" bit in the register file B. Then, a second write command is used to write the control word J (35) that has the address data to select the "Offset Bit0" and the corresponding data for the "Offset Bit0". Then, a third write command is used to write the control word J (35) that has the address data to select the "Offset Bit1" and the corresponding data for the "Offset Bit1". Then, a fourth write command is used to write the control word J (35) that has the address data to select the "Read Enable" bit from the selected register group and the input data for setting the "Read Enable" bit to the read mode. Then, a fifth write command is used to write a control word that is to be read, which causes the bit specified by the "Offset Bit0" and "Offset Bit1" to be read out through the pin designed for parity error output, before the new data is written into the register.

Alternatively, when the "Read Enable" bit is set to the read mode, the write command addressed to a register other than the control word I and J (33 and 35) causes the circuit to read out the data from the register without writing the input data into the addressed register, or to read out the data from the register and rewrite the read from the register back into the register, or to read out the bit identified by the offset data and write the input data for the identified bit without writing the other bits of the register.

Alternatively, the complete data of the register, or data in the bits of the register which are not selected by the offset data, is read out from the register and written into a predefined location in the register file B (41), which can be subsequently read out one bit a time.

In one embodiment, the "Bit X" in the register file B (41) is used to indicate whether or not to overwrite the register according to the input data when the "Read Enable" bit is set to the read mode.

In one embodiment, in response to each write command to the same register in the register file A (31), a counter automatically increments the offset stored in the "Offset Bit0" and the "Offset Bit1" in a cyclic fashion to loop through each bit of the register to read out different bits of the register. Thus, different bits of a four-bit register in register file A (31) can be read without the need to use write commands to control words I and J (33) to update the offset data in the register file B (41).

In one embodiment, the circuit stores the address of the previous write command to determine if the current address of the write command for accessing the registers in register file A (31) is the same as the previous one. When the current address is different from the previous one, the offset bits in the register file B is reset to read the first bit in the register when the "Read Enable" bit is set to the read mode; when the current address is same as the previous one, the offset bits in the register file B is incremented one at a time to read through the subsequent bits of the register when the "Read Enable" bit is set to the read mode.

In one embodiment, each register bit in the register file B can be read via writing into the register bit while the "Read Enable" bit is set to the read mode.

For example, to read the "Bit X" in the register file (41), a first write command can be used to set the control word I (33) to select the register group that contains the "Read Enable" bit; then a second write command can be used to set the control word J (33) to select the "Read Enable" bit from the selected group and to set the "Read Enable" bit to the read mode; then a third write command can be used to set the control word I (33) to select the register group that contains the "Bit X"; then a fourth write command can be used to set the control word J (33) to select the "Bit X" from the selected group and to provide the new data for the "Bit X", which causes the circuit to output the old data from the "Bit X" before the new data is written into the "Bit X".

Alternatively, when the "Read Enable" bit is set in the read mode, the new data is not written into the addressed bit in the register file, if the addressed bit is not the "Read Enable" bit.

In one embodiment, when the control word J (35) provides more bits than that can be read out through the output channel, a portion of the data addressed by the control words (33 and 35) is read via one or more offset bits (e.g., "Offset Bit0" and/or "Offset Bit1"). Similarly, a counter may be used to automatically set the offset data to read the first bit of the addressed bits if the address provided by the control words (33 and 35) is not the same as the previous one and automatically incremented to read subsequent bits when the address provided by the control words (33 and 35) is the same as the previous one.

Thus, the techniques of the disclosure can be used to extend the functionality of a circuit that has pre-defined communication protocol through the use of vendor specific control words. After read operations are added to a registering clock driver according to the SSTE32882 standard, the control registers can not only be written, but also be read to provide better visibility for the silicon debug without any additional pad cost. Further, in one embodiment, the host software modification is minimized via enabling read operations through write operations.

In the foregoing specification, the disclosure has been provided with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A circuit, comprising:
a first set of registers;
a second set of registers coupled with the first set of registers, the second set of registers to be written via one or more write operations addressed to one or more registers of the first set, wherein an address to select one from the second set is stored in at least one register of the first set; and
a read controller coupled with the first and second sets of registers, the read controller to selectively output a portion of data stored in the first and second sets of registers based on data stored in one or more registers of the second set.

2. The circuit of claim 1, wherein the circuit is integrated on a chip.

3. A circuit, comprising:
a first set of registers;
a second set of registers coupled with the first set of registers, the second set of registers to be written via one or more write operations addressed to one or more registers of the first set; and
a read controller coupled with the first and second sets of registers, the read controller to selectively output a portion of data stored in the first and second sets of registers based on data stored in one or more registers of the second set;
wherein the circuit is integrated on a chip; and
wherein the circuit comprises a registering clock driver integrated on the chip.

4. The circuit of claim 3, wherein the registering clock driver is in accordance with a Joint Electron Device Engineering Councils (JEDEC) standard.

5. The circuit of claim 3, wherein the registering clock driver is in accordance with a Joint Electron Device Engineering Councils (JEDEC) standard for an SSTE32882 registering clock driver with parity for DDR3 (Double Data Rate 3) RDIMM (Registered Dual In-Line Memory Module) applications.

6. A circuit, comprising:
a first set of registers;
a second set of registers coupled with the first set of registers, the second set of registers to be written via one or more write operations addressed to one or more registers of the first set;
a read controller coupled with the first and second sets of registers, the read controller to selectively output a portion of data stored in the first and second sets of registers based on data stored in one or more registers of the second set;
a logic block; and
a multiplexer coupled with the logic block, the read controller and the second set of registers, the multiplexer to select from an output of the logic block and an output of the read controller as an output of the circuit based on the data stored in the one or more registers of the second set.

7. The circuit of claim 6, wherein the logic block generates an output to indicate whether or not a parity error has occurred; and the read controller reads one bit from one of the first and second sets of registers according to the data stored in one of the second set of registers when one register of the first set is written.

8. The circuit of claim 7, where the one bit read by the read controller is from the register of the first set that is being written according to an input data.

9. The circuit of claim 8, wherein the one bit is read by the read controller before the register is written into according to the input data.

10. The circuit of claim 6, wherein when a first bit of a register of the second set is in a first state, the multiplexer selects the output of the logic block; when the first bit of the register of the second set is in a second state, the multiplexer selects the output of the read controller.

11. The circuit of claim 10, wherein the first set of registers comprises:
a first plurality of registers to store data to control operations of the circuit according to a standard; and
a second plurality of registers to store vendor specific data to control operations of the circuit.

12. The circuit of claim 11, wherein the second plurality of registers to store vendor specific data include a first register and a second register, the first register to store data for selecting a group of registers from the second set, the second register to receive first data identifying one or more bits of the selected group and second data to be written in the one or more bits identified according to the first data, the second data to be written into the one or more bits of the selected group of registers of the second set in response to the second register being written into.

13. The circuit of claim 12, wherein when the first bit is in the second state, data stored in the one or more bits identified according to the first data is read by the read controller for selection by the multiplexer before the second data is written into the identified one or more bits.

14. The circuit of claim 12, wherein when the first bit is in the second state, data stored in the one or more bits identified according to the first data is rewritten back into the identified one or more bits, if the identified one or more bits do not include the first bit; and when the first bit is in the first state, the second data is written into the identified one or more bits.

15. The circuit of claim 11, wherein one or more second bits of the register of the second set is to store data identifying one or more bits of a register of the first set; when the first bit is in the second state, data stored in the one or more bits identified according to the one or more second bits is read by the read controller for selection by the multiplexer before the register of the first set is written into.

16. The circuit of claim 11, wherein one or more second bits of the register of the second set is to store data identifying one or more bits of a register of the first set; when the first bit is in the second state, data stored in the register of the first set is rewritten back into the register of the first set by the read controller when the circuit receives input to write into the register of the first set.

17. An integrated circuit, comprising:
a plurality of registers; and
a read controller coupled with the plurality of registers, the read controller to output a portion of data stored in a first register of the plurality of registers when the circuit receives input to write into the first register, the portion to be selected according to data stored in a second register of the plurality of registers.

18. The integrated circuit of claim 17, further comprising:
a logic block; and
a multiplexer coupled to the read controller and the logic block;
wherein when a bit of the second register is in a first state, the multiplexer selects logic block; and
when the bit of the second register is in a second state, the multiplexer selects the read controller.

19. The integrated circuit of claim 17, further comprising:
a logic block to check parity error;
a read controller to read out at least a portion of a register of the first and second sets when the integrated circuit receives an input to write into the register; and
a multiplexer coupled to the read controller and the logic block;
wherein when a bit of the second set of registers is in a first state, the multiplexer selects the logic block; and
when the bit of the second set of registers is in a second state, the multiplexer selects the read controller.

20. The integrated circuit of claim 17, wherein the portion of data stored in the first register is outputted to a plurality of pins of the integrated circuit in response to the circuit receives input to write into the first register.

21. An integrated circuit, comprising:
a first set of registers, including a first register and a second register; and
a second set of registers coupled with the first set of registers, a group of registers of the second set to be identified by data stored in the first register, one or more bits of the group to be identified by a portion of data stored in the second register;
wherein in response to the second register being written into, a portion of data written into the second register is further written into the one or more bits of the group identified by the data stored in the first and second registers.

* * * * *